Patented Apr. 4, 1933

1,903,346

UNITED STATES PATENT OFFICE

GOTTLEB WELSCH, OF SHEBOYGAN, WISCONSIN

COMPOSITION FOR REFINISHING ENAMELED SURFACES

No Drawing.    Application filed September 17, 1928.   Serial No. 306,619.

My invention relates to compositions for refinishing enameled surfaces, and especially for refinishing blemished surfaces of enameled metal ware, such as the enameled surfaces of bathtubs, kitchen sinks, and the like.

The enamel comprising such substances as borax, felspar, quartz, soda, cryolite, and the like, is applied in superposed layers or coats and very often, after firing the last coat of enamel may show a blemish, being imperfect in any one of a number of respects, and it is an object of my invention to provide for the resurfacing of the blemished portions of such outer coating of enamel.

In order to accomplish this, I preferably burnish the surface of the blemished portion of the enameled ware by a buffing polishing wheel or the like, to which there has been applied, mixtures of various substances hereinafter set forth, according to rapidity of abrasive effect desired to be obtained, according to the hardness of the enameled coat operated upon, and according to the necessity for keeping the work cool while refinishing of the blemished enameled surface progresses.

Although the preparation of and the precise identity of the different substances contained in the mixture, may vary, several characteristic compositions mixed with two gallons of water are as follows:

Formula A

1½ # zinc
2   # quartz
3   # felspar
½   # sodium carbonate
¼   # sodium chloride
6 oz. sodium-saltpetre
3 oz. soda ash

Formula B

2   # zinc
2   # quartz
2½  # felspar
6 oz. sodium-saltpetre

Formula C

2   # tin oxide
2   # quartz
3   # felspar
½   # sodium chloride
2 oz. antimoniate of soda (leukonin)

A mixture of the above substances, according to Formulas A, B, or C, with two gallons of water, is then applied to the buffing wheel, which will buff the blemished surfaces.

The composition of Formula A will operate at a relatively low temperature, the friction of the abrasive applied to the blemished surfaces of the enamel, not setting up any considerable amount of heat, and the saltpetre and soda ash, are especially effective in keeping the work cool during the operation. The compositions of Formulas B and C will operate at medium and high temperatures relative to the colder operating mixture of Formula A.

Sometimes I add to the above formulas, about 3 oz. of boracic acid which causes the mixture to adhere better to the buffing wheel; otherwise upon high speeds of the buffing wheel it would be thrown off. Also at the same time the saltpetre and boracic acid causes the work to remain cooler than would otherwise be the case, assuming that the mixture is continually supplied to the wheel and does not become dry. The felspar and quartz are abrasive components of the mixtures while the zinc flour causes the work to take a high glossy polish. Where boracic acid is used, the quantity of saltpetre and soda ash may be decreased or these materials entirely eliminated.

The process may comprise the operation of the buffing wheel, meanwhile applying the wet mixture therto, continuously until the blemish is removed.

However, I sometimes contemplate continuing the buffing for a considerable period after the mixture has become more or less dry, especially when using the Formula C. In this case the surface of the work finally becomes a glossy black color, which black glossy surface is subsequently removed by rebuffing with a wetter wheel, slightly, until the black color is removed.

Having thus described my improved composition in varying embodiment mixtures employed for the buffing operation, I am aware that numerous and extensive departures may be made from the embodiments of my invention herein illustrated and described, but without departing from the spirit of my invention.

I claim:

1. The process of eradicating blemishes from the surfaces of enameled metal ware comprising burnishing the surface of the blemished portion by the burnishing effect of a wet compound containing predominating portions of an abrasive substance such as quartz, and a glossing substance such as zinc flour rubbed on to the blemished portion until the mixture has become dry through heat developed incidental to burnishing.

2. The process of eradicating blemishes from the surfaces of enameled metal ware comprising burnishing the surface of the blemished portion by the burnishing effect of a wet compound containing predominating portions of an abrasive substance such as quartz, and a glossing substance such as zinc flour rubbed on to the blemished portion, meanwhile maintaining the temperature lowered by the inclusion of a cooling medium such as boracic acid to the burnishing compound, and continuing the burnishing until the mixture has become dry through heat developed incidental to burnishing.

In testimony whereof I hereunto affix my signature this 1 day of September, 1928.

GOTTLEB WELSCH.